(12) United States Patent
Scheevel (10) Patent No.: US 9,160,709 B2
(45) Date of Patent: *Oct. 13, 2015

(54) SYSTEM AND METHOD FOR MANAGING PAGE VARIATIONS IN A PAGE DELIVERY CACHE

(71) Applicant: Open Text S.A., Luxembourg (LU)

(72) Inventor: Mark R. Scheevel, Austin, TX (US)

(73) Assignee: Open Text S.A., Luxembourg (LU)

(*) Notice: Subject to any disclaimer, the term of this patent is extended or adjusted under 35 U.S.C. 154(b) by 0 days.

This patent is subject to a terminal disclaimer.

(21) Appl. No.: 14/477,728

(22) Filed: Sep. 4, 2014

(65) Prior Publication Data

US 2014/0379842 A1    Dec. 25, 2014

Related U.S. Application Data

(63) Continuation of application No. 13/619,861, filed on Sep. 14, 2012, now Pat. No. 8,850,138, which is a continuation of application No. 12/208,072, filed on Sep. 10, 2008, now Pat. No. 8,463,998, which is a (Continued)

(51) Int. Cl.
*G06F 12/08* (2006.01)
*H04L 29/12* (2006.01)
*G06F 17/30* (2006.01)
*H04L 29/06* (2006.01)

(52) U.S. Cl.
CPC ...... *H04L 61/6009* (2013.01); *G06F 17/30887* (2013.01); *G06F 17/30902* (2013.01); *H04L 67/42* (2013.01); *G06F 12/08* (2013.01)

(58) Field of Classification Search
CPC ... G06F 12/08; G06F 17/30902; G06F 17/30; G06F 17/30887; H04L 61/6009; H04L 67/42
USPC .......................... 711/118, 133, 159, E12.017
See application file for complete search history.

(56) References Cited

U.S. PATENT DOCUMENTS 5,202,982 A    4/1993  Gramlich et al.
5,473,772 A    12/1995 Halliwell et al.
(Continued)

OTHER PUBLICATIONS

Chen et al., "Wormhole Caching with HTTP PUSH Method for Satellite-Based Web Content Multicast and Replication System" Workshop 99, pp. 1-14, 1999.

(Continued)

*Primary Examiner* — Pierre-Michel Bataille
(74) *Attorney, Agent, or Firm* — Sprinkle IP Law Group (57) ABSTRACT

Embodiments disclosed herein provide a high performance content delivery system in which versions of content are cached for servicing web site requests containing the same uniform resource locator (URL). When a page is cached, certain metadata is also stored along with the page. That metadata includes a description of what extra attributes, if any, must be consulted to determine what version of content to serve in response to a request. When a request is fielded, a cache reader consults this metadata at a primary cache address, then extracts the values of attributes, if any are specified, and uses them in conjunction with the URL to search for an appropriate response at a secondary cache address. These attributes may include HTTP request headers, cookies, query string, and session variables. If no entry exists at the secondary address, the request is forwarded to a page generator at the back-end.

20 Claims, 8 Drawing Sheets

Related U.S. Application Data continuation-in-part of application No. 11/825,909, filed on Jul. 10, 2007, now Pat. No. 7,818,506, which is a continuation-in-part of application No. 10/733,742, filed on Dec. 11, 2003, now Pat. No. 7,360,025.

(60) Provisional application No. 60/433,408, filed on Dec. 13, 2002.

(56) References Cited

U.S. PATENT DOCUMENTS

| | | | |
|---|---|---|---|
| 5,504,879 A | 4/1996 | Eisenberg et al. | |
| 5,740,430 A | 4/1998 | Rosenberg et al. | |
| 5,946,697 A | 8/1999 | Shen | |
| 6,026,413 A | 2/2000 | Challenger | |
| 6,029,175 A | 2/2000 | Chow et al. | |
| 6,138,128 A | 10/2000 | Perkowitz et al. | |
| 6,151,607 A | 11/2000 | Lomet | |
| 6,151,624 A | 11/2000 | Teare et al. | |
| 6,178,461 B1 | 1/2001 | Chan et al. | |
| 6,192,415 B1 | 2/2001 | Haverstock et al. | |
| 6,198,824 B1 | 3/2001 | Shambroom | |
| 6,216,212 B1 | 4/2001 | Challenger | |
| 6,256,712 B1* | 7/2001 | Challenger et al. | 711/141 |
| 6,263,403 B1 | 7/2001 | Traynor | |
| 6,272,492 B1 | 8/2001 | Kay et al. | |
| 6,286,043 B1 | 9/2001 | Cuomo et al. | |
| 6,408,360 B1 | 6/2002 | Chamberlain et al. | |
| 6,487,641 B1 | 11/2002 | Cusson et al. | |
| 6,571,246 B1 | 5/2003 | Anderson et al. | |
| 6,591,266 B1 | 7/2003 | Li et al. | |
| 6,615,263 B2* | 9/2003 | Dulai et al. | 709/225 |
| 6,651,217 B1 | 11/2003 | Kennedy et al. | |
| 6,697,844 B1 | 2/2004 | Chan et al. | |
| 6,701,428 B1 | 3/2004 | Harvey, III et al. | |
| 6,725,333 B1 | 4/2004 | Degenaro | |
| 6,754,621 B1 | 6/2004 | Cunningham et al. | |
| 6,760,813 B1 | 7/2004 | Wu | |
| 6,772,203 B1 | 8/2004 | Feiertag et al. | |
| 6,785,769 B1 | 8/2004 | Jacobs et al. | |
| 6,850,941 B1 | 2/2005 | White et al. | |
| 6,879,528 B2 | 4/2005 | Takeuchi et al. | |
| 7,013,289 B2 | 3/2006 | Horn | |
| 7,024,452 B1 | 4/2006 | O'Connell et al. | |
| 7,096,418 B1 | 8/2006 | Singhal | |
| 7,137,009 B1 | 11/2006 | Gordon et al. | |
| 7,146,415 B1 | 12/2006 | Doi | |
| 7,188,216 B1 | 3/2007 | Rajkumar et al. | |
| 7,251,681 B1 | 7/2007 | Gourlay | |
| 7,284,100 B2 | 10/2007 | Slegel et al. | |
| 7,325,045 B1 | 1/2008 | Manber et al. | |
| 7,343,422 B2 | 3/2008 | Garcia-Luna-Aceves | |
| 7,360,025 B1 | 4/2008 | O'Connell et al. | |
| 7,398,304 B2 | 7/2008 | Smith et al. | |
| 7,596,564 B1 | 9/2009 | O'Connell et al. | |
| 7,752,394 B1 | 7/2010 | Rajkumar et al. | |
| 7,818,506 B1 | 10/2010 | Shepstone | |
| 7,899,991 B2 | 3/2011 | Rajkumar | |
| 8,041,893 B1 | 10/2011 | Fung | |
| 8,312,222 B1 | 11/2012 | Martin et al. | |
| 8,380,932 B1 | 2/2013 | Martin et al. | |
| 8,429,169 B2 | 4/2013 | Koopmans et al. | |
| 8,438,336 B2 | 5/2013 | Fung et al. | |
| 8,452,925 B2 | 5/2013 | Shepstone et al. | |
| 8,463,998 B1 | 6/2013 | Scheevel | |
| 8,832,387 B2 | 9/2014 | Martin et al. | |
| 8,850,138 B2 | 9/2014 | Scheevel | |
| 9,081,807 B2 | 7/2015 | Martin et al. | |
| 2001/0032254 A1 | 10/2001 | Hawkins | |
| 2001/0034771 A1 | 10/2001 | Hutsch et al. | |
| 2001/0037407 A1 | 11/2001 | Dragulev et al. | |
| 2002/0065912 A1 | 5/2002 | Catchpole et al. | |
| 2002/0165877 A1 | 11/2002 | Malcolm et al. | |
| 2002/0178187 A1 | 11/2002 | Rasmussen et al. | |
| 2002/0194219 A1 | 12/2002 | Bradley et al. | |
| 2003/0078964 A1 | 4/2003 | Parrella et al. | |
| 2003/0217117 A1 | 11/2003 | Dan et al. | |
| 2004/0030697 A1 | 2/2004 | Cochran et al. | |
| 2004/0030746 A1 | 2/2004 | Kavacheri et al. | |
| 2004/0107319 A1 | 6/2004 | D'Orto et al. | |
| 2004/0205165 A1 | 10/2004 | Melamed et al. | |
| 2004/0205452 A1 | 10/2004 | Fitzsimmons et al. | |
| 2006/0136472 A1 | 6/2006 | Jujjuri et al. | |
| 2006/0184572 A1 | 8/2006 | Meek | |
| 2006/0271671 A1 | 11/2006 | Hansen | |
| 2010/0262785 A1 | 10/2010 | Rajkumar | |
| 2010/0306314 A1* | 12/2010 | O'Connell et al. | 709/203 |
| 2011/0035553 A1 | 2/2011 | Shepstone | |
| 2012/0011324 A1 | 1/2012 | Fung et al. | |
| 2013/0013725 A1 | 1/2013 | Scheevel | |
| 2013/0024622 A1 | 1/2013 | Martin et al. | |
| 2014/0344225 A1 | 11/2014 | Martin et al. | |

OTHER PUBLICATIONS

Fielding et al. "Caching in HTTP" part of "Hypertext Transfer Protocol—HTTP/1.1," The Internet Society, 20 pages, Ch. 13, 1999.

Dias et al., "A Smart Internet Caching System" by University of Moratuwa, Sri Lanka, 13 pages, 1996.

Office Action issued for U.S. Appl. No. 10/733,798, mailed on May 31, 2006, 14 pages.

Office Action issued for U.S. Appl. No. 10/733,798, mailed on Jan. 3, 2006, 9 pages.

Office Action issued for U.S. Appl. No. 10/733,742, mailed on Aug. 22, 2007, 14 pages.

Office Action issued for U.S. Appl. No. 10/733,742, mailed on Feb. 7, 2007, 12 pages.

Office Action issued for U.S. Appl. No. 10/733,742, mailed on Sep. 15, 2006, 8 pages.

Office Action issued for U.S. Appl. No. 10/733,742, mailed on Jun. 6, 2006, 15 pages.

Office Action issued for U.S. Appl. No. 10/733,742, mailed on Jan. 17, 2006, 10 pages.

Office Action issued for U.S. Appl. No. 11/701,193, mailed on Oct. 2, 2008, 9 pages.

Office Action issued for U.S. Appl. No. 11/701,193, mailed on Mar. 31, 2009, 9 pages.

Office Action issued for U.S. Appl. No. 11/825,909, mailed Sep. 29, 2009, 9 pages.

Office Action issued for U.S. Appl. No. 11/701,193, mailed Oct. 22, 2009, 10 pages.

Office Action issued for U.S. Appl. No. 11/825,909, mailed Mar. 5, 2010, 11 pages.

Office Action issued for U.S. Appl. No. 12/819,985, mailed on Aug. 2, 2010, 9 pages.

Notice of Allowance issued for U.S. Appl. No. 12/819,985, mailed Dec. 15, 2010, 9 pages.

Office Action issued for U.S. Appl. No. 12/904,937, mailed Jan. 5, 2011, 8 pages.

Office Action issued for U.S. Appl. No. 12/212,414, mailed May 10, 2011, 10 pages.

Office Action issued for U.S. Appl. No. 12/208,934, mailed May 10, 2011, 11 pages.

Office Action issued for U.S. Appl. No. 12/904,937, mailed May 25, 2011, 9 pages.

Notice of Allowance issued for U.S. Appl. No. 12/206,909, mailed Jul. 12, 2011, 10 pages.

Office Action issued for U.S. Appl. No. 12/904,937, mailed Sep. 2, 2011, 11 pages.

Office Action issued for U.S. Appl. No. 12/208,072, mailed Sep. 23, 2011, 10 pages.

Office Action issued for U.S. Appl. No. 12/208,934, mailed Oct. 17, 2011, 11 pages.

Office Action issued for U.S. Appl. No. 12/212,414, mailed Oct. 17, 2011, 11 pages.

Office Action issued for U.S. Appl. No. 12/904,937, mailed Dec. 1, 2011, 10 pages.

Notice of Allowance issued for U.S. Appl. No. 13/237,236, mailed Mar. 9, 2012, 4 pages.

(56) References Cited

OTHER PUBLICATIONS

Notice of Allowance issued for U.S. Appl. No. 12/208,072, mailed Feb. 27, 2012, 2 pages.
Office Action issued for U.S. Appl. No. 12/208,934, mailed Mar. 27, 2012, 11 pages.
Office Action issued for U.S. Appl. No. 12/212,414, mailed Mar. 28, 2012, 10 pages.
Notice of Allowance issued for U.S. Appl. No. 12/904,937, mailed Apr. 24, 2012, 3 pages.
Office Action issued for U.S. Appl. No. 12/212,414, mailed Sep. 17, 2012, 6 pages.
Notice of Allowance issued for U.S. Appl. No. 13/237,236, mailed Dec. 6, 2012, 4 pages.
Notice of Allowance issued for U.S. Appl. No. 12/208,072, mailed Dec. 26, 2012, 2 pages.
Notice of Allowance issued for U.S. Appl. No. 12/904,937, mailed Jan. 22, 2013, 3 pages.
Notice of Allowance issued for U.S. Appl. No. 13/237,236, mailed Mar. 18, 2013, 4 pages.
Notice of Allowance issued for U.S. Appl. No. 12/208,072, mailed Apr. 16, 2013, 2 pages.
Office Action issued for U.S. Appl. No. 13/620,396, mailed Dec. 3, 2013, 9 pages.
Office Action issued for U.S. Appl. No. 13/619,861, mailed Dec. 3, 2013, 9 pages.
Notice of Allowance issued for U.S. Appl. No. 13/619,861, mailed Apr. 28, 2014, 8 pages.
Notice of Allowance issued for U.S. Appl. No. 13/620,396, mailed on May 8, 2014, 7 pages.
Notice of Allowance issued for U.S. Appl. No. 13/619,861, mailed May 23, 2014, 4 pages.
Office Action issued for U.S. Appl. No. 14/447,082, mailed Oct. 6, 2014, 10 pages.
Notice of Allowance issued for U.S. Appl. No. 14/447,08, mailed Mar. 16, 2015, 8 pages.

* cited by examiner

SYSTEM AND METHOD FOR MANAGING PAGE VARIATIONS IN A PAGE DELIVERY CACHE

CROSS-REFERENCE TO RELATED APPLICATIONS

This is a continuation of and claims a benefit of priority under 35 U.S.C. §120 from U.S. patent application Ser. No. 13/619,861, filed Sep. 14, 2012, entitled "SYSTEM AND METHOD FOR MANAGING PAGE VARIATIONS IN A PAGE DELIVERY CACHE," which is a continuation of U.S. patent application Ser. No. 12/208,072, filed Sep. 10, 2008, now U.S. Pat. No. 8,463,998, entitled "SYSTEM AND METHOD FOR MANAGING PAGE VARIATIONS IN A PAGE DELIVERY CACHE," which is a continuation-in-part application of U.S. patent application Ser. No. 11/825,909, filed Jul. 10, 2007, now U.S. Pat. No. 7,818,506, entitled "METHOD AND SYSTEM FOR CACHE MANAGEMENT," which is a continuation-in-part application of U.S. patent application Ser. No. 10/733,742, filed Dec. 11, 2003, now U.S. Pat. No. 7,360,025, entitled "METHOD AND SYSTEM FOR AUTOMATIC CACHE MANAGEMENT," which claims priority from Provisional Application No. 60/433,408, filed Dec. 13, 2002, entitled "EXTENSIBLE FRAMEWORK FOR CACHING AND CONFIGURABLE CACHING PARAMETERS." All applications cited within this paragraph are fully incorporated herein by reference.

TECHNICAL FIELD

This disclosure relates generally to disk-based caching systems and, more particularly, to high performance content delivery systems utilizing such caching systems to service web site requests. Even more particularly, this disclosure provides systems and methods for managing page variations in a page delivery cache.

BACKGROUND

Communication of data over computer networks, particularly the Internet, has become an important, if not essential, way for many organizations and individuals to disseminate information. The Internet is a global network connecting millions of computers using a client-server architecture in which any computer connected to the Internet can potentially receive data from and send data to any other computer connected to the Internet. The Internet provides a variety of methods in which to communicate data, one of the most ubiquitous of which is the World Wide Web, also referred to as the web. Other methods for communicating data over the Internet include e-mail, Usenet newsgroups, telnet and FTP.

The World Wide Web is a system of Internet servers, typically called "web servers", that support the documents and applications present on the World Wide Web.

Documents, known as web pages, may be transferred across the Internet according to the Hypertext Transfer Protocol ("HTTP") while applications may be run by a Java virtual machine present in an internet browser. Web pages are often organized into web sites that represent a site or location on the Web. The web pages within a web site can link to one or more web pages, files, or applications at the same web site or at other web sites. A user can access web pages using a browser program running on the user's computer or web-enabled device and can "click on" links in the web pages being viewed to access other web pages.

Each time the user clicks on a link, the browser program generates a request and communicates it to a web server hosting web pages or applications associated with the web site. The web server retrieves the requested web page or application from an application server or Java server and returns it to the browser program. Web pages and applications can provide a variety of content, including text, graphics, interactive gaming and audio and video content.

Because web pages and associated applications can display content and receive information from users, web sites have become popular for enabling commercial transactions. As web sites become more important to commerce, businesses are increasingly interested in quickly providing responses to user's requests. One way of accelerating responses to requests on a web site is to cache the web pages or applications delivered to the requesting user in order to allow faster access time to this content when it is next requested.

Commercial web sites typically want to serve different versions of a page to different requesters even though those requesters all request the same Uniform Resource Locator (URL). For example, the front page of a site is often addressed simply as /index.html or /index.jsp, but the site operator may wish to deliver different versions of that page depending upon some property of the requester. Common examples are versions of a page in different languages. The selection of an appropriate variant to serve is commonly known as content negotiation, which is defined in the Hypertext Transfer Protocol (HTTP) specification.

Existing content negotiation schemes (as typified in Request for Comments (RFCs) 2616, 2295, and 2296) apply to general characteristics of content: the language used in the content, the style of markup, etc. A user-agent (i.e., a client application used with a particular network protocol, particularly the World Wide Web) can include in a request a description of its capabilities and preferences in these areas, and a server can deduce the best version of content to send in response. For example, a client application may specify, via headers in an HTTP request, that it prefers to receive English, French, and German content, in that order; if the server receives a request for a page that is available only in French and German, it will send the French version in response. This preference will only be applied when there is a choice of representations which vary by language. It's also possible for the server to respond with a list of possible options with the expectation that the client application will then employ its own algorithm to select one of those options and request it. These schemes rely on a certain degree of cooperation on the client application's part, and concern variations that the client application can reasonably be expected to be aware of.

Currently, some servers support driven content negotiation as defined in the HTTP/1.1 specification. Some servers also support transparent content negotiation, which is an experimental negotiation protocol defined in RFC 2295 and RFC 2296. Some may offer support for feature negotiation as defined in these RFCs. An HTTP server like Apache provides access to representations of resource(s) within its namespace, with each representation in the form of a sequence of bytes with a defined media type, character set, encoding, etc. A resource is a conceptual entity identified by a URI (RFC 2396). Each resource may be associated with zero, one, or more than one representation at any given time. If multiple representations are available, the resource is referred to as negotiable and each of its representations is termed a variant. The ways in which the variants for a negotiable resource vary are called the dimensions of negotiation.

In order to negotiate a resource, a server typically needs to be given information about each of the variants. In an HTTP server, this can be done in one of two ways: consult a type map (e.g., a *.var file) which names the files containing the variants explicitly, or do a search, where the server does an implicit filename pattern match and chooses from among the results. In some cases, representations or variants of resource are stored in a cache. When a cache stores a representation, it associates it with the request URL. The next time that URL is requested, the cache can use the stored representation. However, if the resource is negotiable at the server, this might result in only the first requested variant being cached and subsequent cache hits might return the wrong response. To prevent this, the server can mark all responses that are returned after content negotiation as non-cacheable by the clients.

SUMMARY

Embodiments disclosed herein can increase the performance of a content delivery system servicing web site requests. In some embodiments, these web site requests are HTTP requests. Embodiments disclosed herein can allow developers of business applications to cache different versions of content to be served in response to HTTP requests for the same URL. Example versions of a page include pages in different languages, public content for anonymous users versus secure content for authenticated users, or different versions for users belonging to different service categories (e.g., gold, silver, bronze patrons, or frequent flyers over specific mileage thresholds).

In some embodiments, the following additional attributes can be used to determine what version of content to serve:
1. The values of one or more HTTP request headers.
2. The values of one or more HTTP cookies.
3. The value of the HTTP query string.
4. The existence (or lack thereof) of one or more HTTP request headers.
5. The existence (or lack thereof) of one or more HTTP cookies.
6. The values of one or more session attributes. In some embodiments, these are J2EE (Java Platform, enterprise edition) session attributes.

In embodiments disclosed herein, when a page is cached, certain metadata is also stored along with the page. That metadata includes a description of what extra attributes, if any, must be consulted to determine what version of content to serve in response to a request. When a request is fielded, a cache reader consults this metadata, then extracts the values of the extra attributes, if any are specified, and uses them in conjunction with the request URL to select an appropriate response.

The above-described scheme has many advantages. One advantage is the simplification of the URL structure of a web site. Previously, the variation dimensions have to be encoded into the URLs. For example, a common practice for multilingual sites is to segregate the content by adding a language specifier at the top of the URL space, as with /en/index.jsp, /fr/index.jsp, etc. This is tractable because it's reasonable to assume that the language choice applies to all of the pages under the language specifier, but quickly becomes intractable when individual pages are subject to different sets of variation parameters. Furthermore, it becomes difficult or impossible for humans to predict or remember URLs. For the same reason, these schemes also interfere with so-called "search engine optimization": the design of URLs that lead to high relevance ratings for major search engines. Embodiments disclosed herein can allow a site designer to keep this variation information out of the URLs themselves, thereby helping with both of those problems.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION

The disclosure and various features and advantageous details thereof are explained more fully with reference to the exemplary, and therefore non-limiting, embodiments illustrated in the accompanying drawings and detailed in the following description. Descriptions of known programming techniques, computer software, hardware, operating platforms and protocols may be omitted so as not to unnecessarily obscure the disclosure in detail. It should be understood, however, that the detailed description and the specific examples, while indicating the preferred embodiments, are given by way of illustration only and not by way of limitation. Various substitutions, modifications, additions and/or rearrangements within the spirit and/or scope of the underlying inventive concept will become apparent to those skilled in the art from this disclosure.

Software implementing embodiments disclosed herein may be implemented in suitable computer-executable instructions that may reside on a computer-readable storage medium. Within this disclosure, the term "computer-readable storage medium" encompasses all types of data storage medium that can be read by a processor. Examples of computer-readable storage media can include random access memories, read-only memories, hard drives, data cartridges, magnetic tapes, floppy diskettes, flash memory drives, optical data storage devices, compact-disc read-only memories, and other appropriate computer memories and data storage devices.

As used herein, the terms "comprises," "comprising," "includes," "including," "has," "having" or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead these examples or illustrations are to be regarded as being described with respect to one particular embodiment and as illustrative only. Those of ordinary skill in the art will appreciate that any term or terms with which these examples or illustrations are utilized encompass other embodiments as well as implementations and adaptations thereof which may or may not be given therewith or elsewhere in the specification and all such embodiments are intended to be included within the scope of that term or terms. Language designating such non-limiting examples and illustrations includes, but is not limited to: "for example," "for instance," "e.g.," "in one embodiment," and the like.

A few terms are defined or clarified to aid in understanding the descriptions that follow. A network includes an interconnected set of server and client computers over a publicly available medium (e.g., the Internet) or over an internal (company-owned) system. A user at a client computer may gain access to the network using a network access provider. An Internet Service Provider ("ISP") is a common type of network access provider. Many ISPs use proxy caches to save bandwidth on frequently-accessed web pages. Web page caches and client-side network file system caches are typically read-only or write-through only to keep the network protocol simple and reliable. A network file system is basically a computer file system that supports sharing of files, printers and other resources as persistent storage over a computer network. A cache of recently visited web pages can be managed by a client computer's web browser. Some browsers are configured to use an external proxy web cache, a server program through which all web requests are routed so that it can cache frequently accessed pages for everyone in an organization. Search engines also frequently make web pages they have indexed available from their cache, which can be useful when web pages are temporarily inaccessible from a web server. Embodiments disclosed herein are directed to cache management for server-side file system caches that store copies of recently requested web content generated by page generation software at the back end, as opposed to the cache of recently visited web pages managed by a client computer's web browser at the front end.

Within this disclosure, the term "software component" refers to at least a portion of a computer program (i.e., a software application). Specifically, a software component can be a piece of code that when executed by a processor causes a machine to perform a particular function. Examples include a content delivery software component, a content management software component, a page generation software component, or the like. Different software components may reside in the same computer program or in different computer programs on the same computer or different computers.

Reference is now made in detail to the exemplary embodiments of the disclosure, examples of which are illustrated in the accompanying drawings. Wherever possible, the same reference numbers will be used throughout the drawings to refer to the same or like parts (elements).

Figure 1:
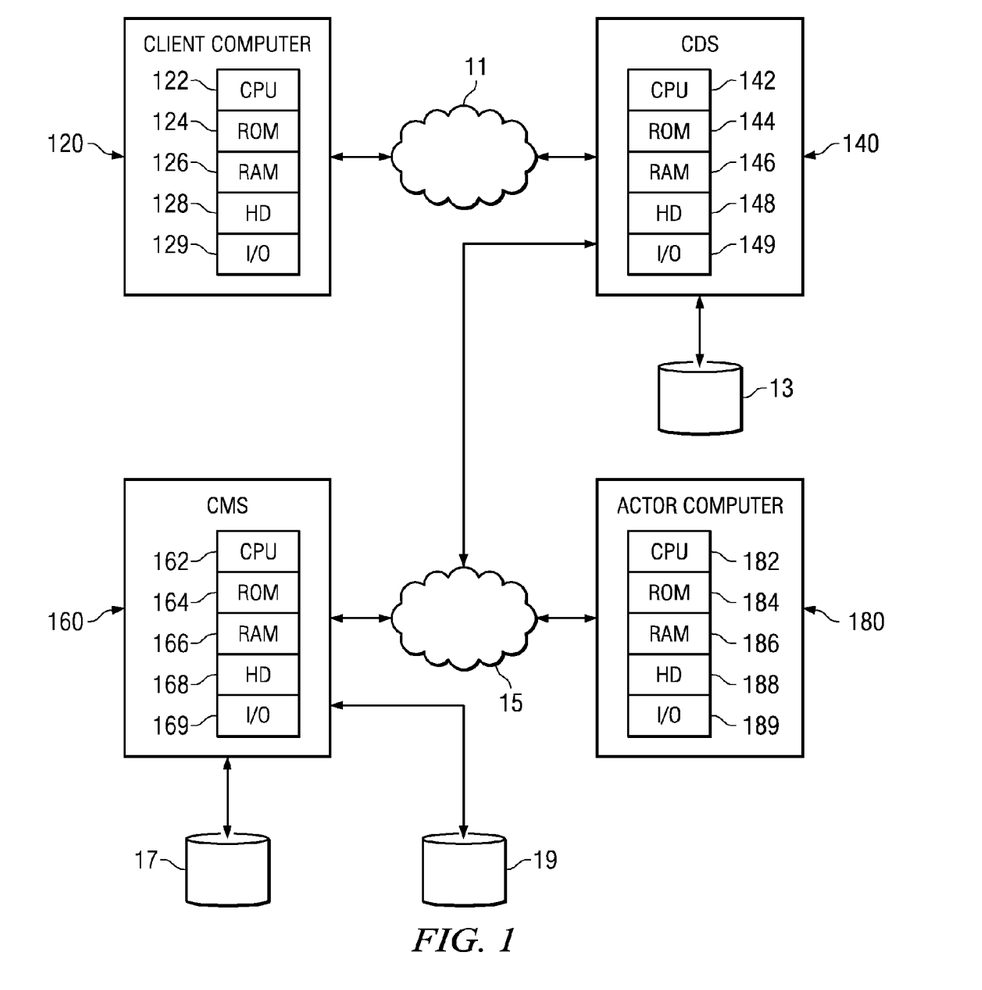
FIG. 1 is a diagrammatic representation of a hardware configuration of a network implementing embodiments disclosed herein.

FIG. 1 illustrates an exemplary architecture and includes external network 11 that can be bi-directionally coupled to client computer 120 and content delivery system ("CDS") 140. CDS 140 can be bi-directionally coupled to database 13. An internal network 15 can be bi-directionally coupled to CDS 140, content management system ("CMS") 160, and actor computer 180. CMS 160 can be bi-directionally coupled to databases 17 and 19, each of which may contain data objects and metadata regarding those objects in tables within those databases. CDS 140, CMS 160, and databases 13, 17, and 19 may be part of a network site. Note that FIG. 1 is a simplification of a hardware configuration.

Within each of CDS 140 and CMS 160, a plurality of computers (not shown) may be interconnected to each other over internal network 15 or a combination of internal and external networks. For simplification, a single system is shown for each of CDS 140 and CMS 160. Other systems such as a page generator, an application server, etc., may be part of CDS 140, CMS 160, or additional systems that are bi-directionally coupled to the internal network 15.

A plurality of other client computers 120 may be bi-directionally coupled to external network 11, and a plurality of actor computers 180 may be coupled to internal network 15. Actor computers 180 may include personal computers or workstations for individuals that use internal network 15. These individuals may include content developers, editors, content reviewers, webmasters, information technology specialists, and the like. Many other alternative configurations are possible and known to skilled artisans.

Client computer 120 can include central processing unit ("CPU") 122, read-only memory ("ROM") 124, random access memory ("RAM") 126, hard drive ("HD") or storage memory 128, and input/output device(s) ("I/O") 129. I/O 129 can include a keyboard, monitor, printer, electronic pointing device (e.g., mouse, trackball, etc.), or the like. Client computer 120 can include a desktop computer, a laptop computer, a personal digital assistant, a cellular phone, or nearly other device capable of communicating over a network. Actor computer 180 may be similar to client computer 120 and can comprise CPU 182, ROM 184, RAM 186, HD 188, and I/O 189.

CDS 140 can include a server computer comprising CPU 142, ROM 144, RAM 146, HD 148, and I/O 149, and CMS 160 can include a server computer comprising CPU 162, ROM 164, RAM 166, HD 168, and I/O 169. CDS 140 or CMS 160 may have one or more of a content delivery software component, a page generator software component, a content management software component, and the like. In some embodiments, the page generator software component is a subcomponent of the content delivery software component.

Each of the computers in FIG. 1 may have more than one CPU, ROM, RAM, HD, I/O, or other hardware components. For simplicity, each computer is illustrated as having one of each of the hardware components, even if more than one is used. The content and its metadata, if any, may be located within any or all of CDS 140, CMS 160, and databases 13, 17, and 19. During staging, a user at actor computer 180 may have access to proxy objects for the content. After staging, data objects may be copied into database 13 via CDS 140, so that the data object may be accessed quicker by CDS 140 to respond to requests from client computer 120. Another advantage is that this separation of content items and proxies allows CDS 140 to deliver one version of a content item (or collection of content items) while the "original" undergoes modification in CMS 160.

Each of computers 120, 140, 160, and 180 is an example of a data processing system. ROM 124, 144, 164, and 184; RAM 126, 146, 166, and 186; HD 128, 148, 168, and 188; and databases 13, 17, and 19 can include media that can be read by CPU 122, 142, 162, or 182. Therefore, these types of memories include computer-readable storage media. These memories may be internal or external to computers 120, 140, 160, or 180.

Figure 2:
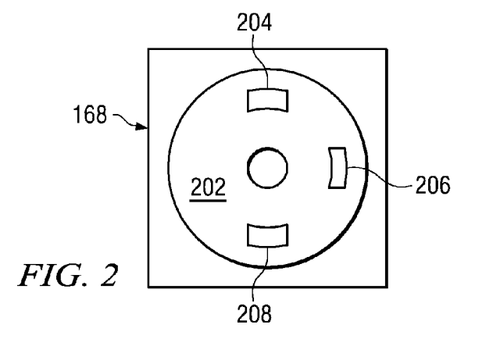
FIG. 2 is a diagrammatic representation of a computer-readable storage medium carrying software code having instructions implementing embodiments disclosed herein.

Portions of the methods described herein may be implemented in suitable software code that may reside within ROM 124, 144, 164, or 184, RAM 126, 146, 166, or 186, or HD 128, 148, 168, or 188. In addition to those types of memories, the instructions in an embodiment disclosed herein may be contained on a data storage device with a different computer-readable storage medium, such as a hard disk. FIG. 2 illustrates a combination of software code elements 204, 206, and 208 that are embodied within a computer-readable storage medium 202, on HD 168. Alternatively, the instructions may be stored as software code elements on a DASD array, magnetic tape, floppy diskette, optical storage device, or other appropriate data processing system readable medium or storage device.

In an illustrative embodiment, the computer-executable instructions may be lines of compiled C++, Java, or other language code. Other architectures may be used. For example, the functions of one computer may be distributed and performed by multiple computers. Additionally, a computer program or its software components with such code may be embodied in more than one computer-readable medium, each of which may reside on or accessible by one or more computers.

In the hardware configuration above, the various software components and subcomponents, including content delivery, page generator, and content manager, may reside on a single server computer or on any combination of separate server computers. In alternative embodiments, some or all of the software components may reside on the same server computer. For example, the content delivery software component and the page generator software component could reside on the same server computer. In some embodiments, the content delivery software component and the page generator software component reside at different levels of abstraction. In some embodiments, the page generator software component is part of the content delivery service provided by the content delivery software component.

Communications between any of the computers in FIG. 1 can be accomplished using electronic, optical, radio-frequency, or other signals. For example, when a user is at client computer 120, client computer 120 may convert the signals to a human understandable form when sending a communication to the user and may convert input from a human to appropriate electronic, optical, radio-frequency, or other signals to be used by client computer 120, systems 140 or 160, or actor computer 180. Similarly, when an operator is at CMS 160, its server computer may convert the signals to a human understandable form when sending a communication to the operator and may convert input from a human to appropriate electronic, optical, radio-frequency, or other signals to be used by computers 120 or 180 or systems 140 or 160.

Attention is now directed to systems and methods for high performance cache management. These systems and methods may be used to manage cached content to be delivered to an end user at a client computer, increasing the performance of content delivery for a web site.

Figure 3:
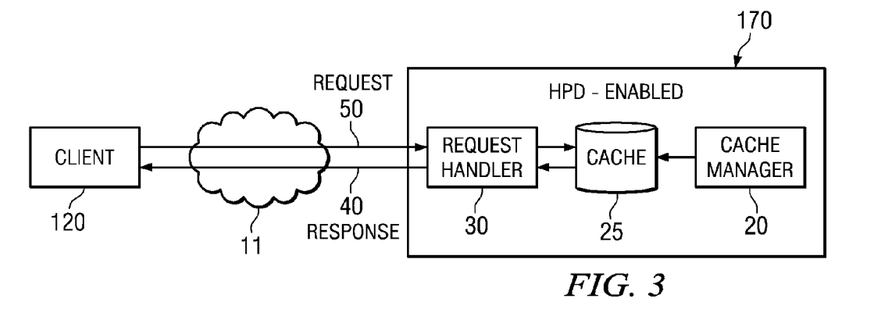
FIG. 3 is a block diagram depicting an embodiment of a high performance content delivery system in communication with a user-agent.
Figure 4:
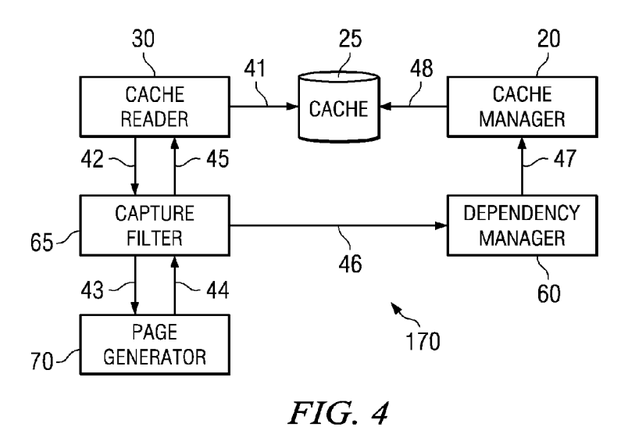
FIG. 4 is a block diagram depicting one embodiment of a content delivery system.

FIG. 3 is a simplified diagrammatical representation of a distributed computing environment where high performance delivery (HPD)-enabled system 170 resides. Within the distributed computing environment, a plurality of computers (not all are shown in FIG. 3) may be interconnected to each other, including web server(s), application server(s), etc. For simplification, a single system is shown for system 170. System 170 can include a server computer comprising CPU, ROM, RAM, HD, and I/O as described above. In some embodiments, system 170 may comprise a content delivery software component, which comprises a page generator software subcomponent, a content management software component, an applications software component, and the like. In the example of FIG. 3, system 170 is shown to comprise request handler 30, cache 25, and cache manager 20 to illustrate scenarios involving these components. For example, in a cache hit scenario, request handler 30 can access cache 25 and return cached response 40 in response to request 50. Additional components of system 170 are shown in FIG. 4 to illustrate a cache miss scenario.

Cache manager 20 can dynamically update content stored in cache 25 based upon conditions other than a request for similar content. More specifically, using metadata stored in the cache with a piece of content, cache manager 20 may regenerate a request, and update the cached content. Cache manager 20 may be registered with an application manager which informs cache manager 20 when content has been updated. Updating the cache may be done in the background, without receiving a new request from a user; this allows content in the cache to be kept current and may drastically improve the performance and response time of a web site. This application manager may be part of a content deployment agent coupled to a content management system. The deployment agent may receive updated content, and the application manager may take notice when content has been updated on the deployment agent. The application manager may also be responsible for the assembly of content to be delivered by an application server in response to a request from a user. Embodiments of an example application manager are described in the above-referenced U.S. patent application Ser. No. 11/825,909, entitled "METHOD AND SYSTEM FOR CACHE MANAGEMENT", filed Jul. 10, 2007. Examples of how a request can be regenerated and used to update cached content can be found in U.S. Pat. No. 7,360,025, entitled "METHOD AND SYSTEM FOR AUTOMATIC CACHE MANAGEMENT," the content of which is incorporated herein by reference.

Within this disclosure, content may be an application or piece of data provided by a web site such as an HTML page, Java application, or the like. In many cases, one piece of content may be assembled from other pieces of content chosen based on a request initiated by a user of the web site. As an example, a user on client computer or web-enabled device 120, through a browser application running thereon, may send request 50 for content over network 11 to request handler 30. Request handler 30 may be a software component of system 170. In some embodiments, request handler 30 further implements the function of a cache reader (CR). The requested content may be a page or a fragment thereof. This page may be associated with a web site or a web portal. The request may be in the form of an HTTP request containing a URL referencing the page as is known in the art.

The end user's request is fielded by CR 30. CR 30 checks cache 25 to see whether a previously-cached response can be used to satisfy the request; if so, it returns that previously-cached response (a cache hit) back to the user via client computer or web-enabled device 120. If no previously-cached response is applicable or can be found in cache 25, it is a cache miss.

FIG. 4 is a block diagram illustrating a cache miss scenario. In this case, the request is forwarded to capture filter (CF) 65 and then on to page generator (PG) 70, which is responsible for actually generating the new response. Once generated, that new response is returned to the end user via CF 65 and CR 30, and it is also submitted to cache 25 via dependency manager (DM) 60 and cache manager (CM) 20. More specifically, at step 41, request handler/cache reader 30 reads cache 25 and no applicable previously-cached response can be found in cache 25. At step 42, handler/cache reader 30 proxies the user's request for content to capture filter 65. At step 43, capture filter 65 may parse the request into a suitable form for further processing by other software components of system 170, set up caching context, and pass control to page generator 70. At step 44, page generator 70 operates to generate a new page or a piece of content responsive to the user's request, annotates the caching context, and returns the generated content and related information to capture filter 65. At step 45, capture filter 65 returns the generated content to request handler 30, which then communicates the content back to the user via client computer or web-enabled device 120. At step 46, capture filter 65 can supply the newly generated content and dependency information associated therewith to dependency manager 60. Dependency manager 60 records the dependency information in a dependency database and, at step 47, communicates the generated content and information associated therewith to cache manager 20. Cache manager 20 then, at step 48, puts (writes) the newly generated content in cache 25. In most cases, incoming requests contain a variety of template data and parameters associated with the request. For example, the request may contain a Universal Resource Locator (URL), originating locale, a query string, or perhaps a user-agent string indicating the type of browser initiating the request. In some embodiments, these template metadata and request metadata are stored with the generated content in cache 25. These template metadata and request metadata can be used to regenerate a request that is identical to the original request from the end user. The regenerated request can be used to automatically update the cache independent of user requests as described in the above-referenced U.S. Pat. No. 7,360,025, entitled "METHOD AND SYSTEM FOR AUTOMATIC CACHE MANAGEMENT." In some embodiments, the metadata stored with the generated content in cache 25 may comprise almost any data obtained in conjunction with the generation of the cache content. For example, as described in the above-referenced U.S. patent application Ser. No. 11/825,909, entitled "METHOD AND SYSTEM FOR CACHE MANAGEMENT", filed Jul. 10, 2007, the metadata stored with the generated content in cache 25 may comprise rule sensitivities associated with the generation of the cached content. These rule sensitivities allow a cache manager to dynamically update cached content based upon conditions other than a request for similar content, including the addition of new content associated with the cached content or alternations or updates to content used to generate the cached content.

By saving in cache 25 a copy of the content generated for a first user, system 170 can serve that copy to a second user if it can be determined that the second user is making an equivalent request. This way, system 170 does not need to regenerate that content afresh for each user. In embodiments disclosed herein, the addresses of entries in the cache are not the same as the uniform resource locators (URLs) that users use to request content. Instead, the address of an entry is a message-digest of the entry's URL and any relevant variation information for that URL. An URL is a compact string of characters used to represent a resource available at a network location. Examples of relevant variation information may include request header values such as locale, language, version, etc. associated with the URL.

Figure 5:
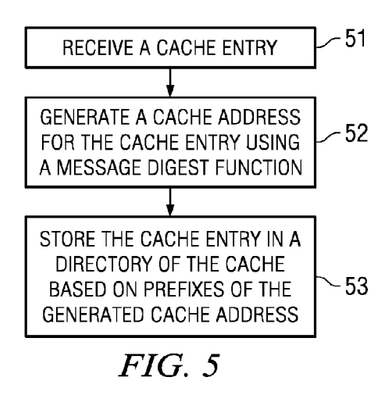
FIG. 5 is a flow diagram illustrating one embodiment of a caching method in which an entry is stored in a directory of a filesystem cache based on prefixes of a message digested address.

FIG. 5 is a flow diagram depicting one embodiment of a caching method exemplifying how the address of a cache entry can be generated. At step 51, the content manager receives a new entry to be stored in the cache. As described above with reference to FIG. 4, the new entry may contain a new page that has been dynamically generated at the back end by a page generator in response to an end user's request for content. The new page may have an URL/site/products.html. At step 52, the content manager may operate to generate a cache address for the new entry using a message-digest function.

A message-digest function is a cryptographic hash function that converts an arbitrary length input into a fixed length result such that the probability of two different inputs producing the same output is vanishingly small. A reliable message-digest function should produce two outputs that are significantly different even for small differences in the two inputs. In one embodiment, Message-Digest algorithm 5 (MD5) is utilized. MD5 produces a 128-bit hash value which is typically expressed as a 32-digit hexadecimal number. For example, the URL/site/products.html produces a cache address of 220F3D1E99AC1691909C4D11965AF27D, while the URL/site/products2.html (which differs only by the addition of a single character) produces a cache address of 5C7CC94AA191EAE80CD9C20B5CF44668. As one of ordinary skill in the art can appreciate, other quality message-digest functions can also be utilized.

At step 53, the cache entry is stored in a directory of the cache using prefixes of the cache address thus generated. In embodiments disclosed herein, prefixes of the cache address are used as directory names in the cache and all entries are stored in the leaves of the directory tree. Thus, following the above example, the first entry might wind up in a directory named 22/0F/3D while the second entry might wind up in a directory named 5C/7C/C9. In this way, the entries in any particular directory are extremely unlikely to be related to one another in any significant way. The randomness of the addresses is useful for balancing purposes: it ensures that no one directory will be overloaded with entries, regardless of how many variants of a single URL might exist.

Figure 6:
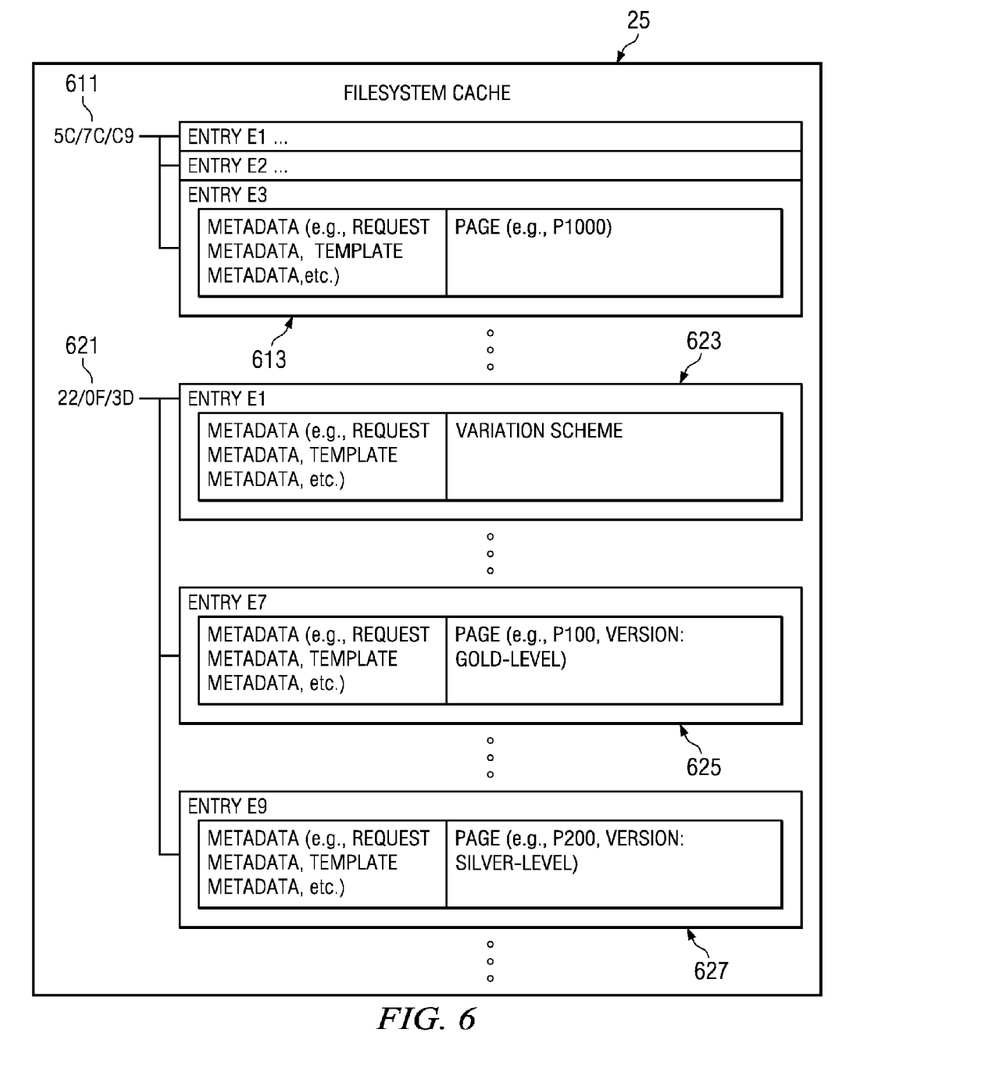
FIG. 6 is a diagrammatic representation of one embodiment of a filesystem cache.

FIG. 6 is a diagrammatic representation of one embodiment of cache 25, which is a filesystem-based cache and which differs from database- and memory-based caches. A filesystem-based cache is sometimes referred to as a disk-based cache. A filesystem is a mechanism for the storage, hierarchical organization, manipulation, navigation, access, and retrieval of computer files and data contained therein. A filesystem generally has directories which associate files with file names. In the example of FIG. 6, cache 25 has a plurality of directories, including directory 611 and directory 621. Unlike conventional filesystem caches, directories in cache 25 are created based on prefixes of computed cache addresses. In some embodiments, directories in cache 25 have the same, fixed lengths. In some embodiments, each of the directories in cache 25 may have one or more entries. Although FIG. 6 shows entries E1, E2, and E3 are placed next to each other under directory 611, this needs not be the case. Cache addresses for these entries may not be consecutive. In some embodiments, cache addresses for entries in a directory may have the same, fixed lengths. Following the above example, cache address 613 may consist of 32-digit hexadecimal number: 5C7CC94AA191EAE80CD9C20B5CF44668.

In some embodiments, cache 25 stores copies of pages that have been provided to client 120 through response(s) 40 to previous request(s) 50. This way, system 170 can quickly service a new request for a page if it can be determined that the new request is asking for the same page. However, in some cases, it may be desirable to serve a variation of the page even if the requester is requesting the same page. For example, it may be that user A is a gold-level customer and user B is a silver-level customer and they both want to view a marketing page containing certain market promotions. System 170 may specify that gold-level customers should be presented with a variation of the marketing page containing gold-level promotions and that silver-level customers should be presented with another variation of the marketing page containing silver-level promotions. In some embodiments, such a presentation decision is made by a page generator component of content delivery system 170. System 170 may store these variants in cache 25 for high performance delivery of content to end users.

In embodiments disclosed herein, Page Generator (PG) 70 is responsible for actually generating pages and their variations. While PG 70 creates a page, it also records information about the page's variations, i.e., whether the page varies according to request headers, query string, cookie values, or session values. In some embodiments, PG 70 records one or more of the following information about the page's variations:

The values of one or more HTTP request headers.
The values of one or more HTTP cookies.
The value of the HTTP query string.
The existence (or lack thereof) of one or more HTTP request headers.
The existence (or lack thereof) of one or more HTTP cookies.
The values of one or more session variables. In some embodiments, these are J2EE (Java Platform, enterprise edition) session variables.

When the page is placed in the cache, the accumulated metadata about the variation scheme is also placed in the cache. If the page isn't subject to any variations, the page and the metadata are located at the same cache address, which is a function of the page's URL only. For example, suppose Page P1000 of FIG. 6 is not subject to any page variations, it is stored with its metadata at cache address 613, which is computed using the page's URL. If the page is subject to any variations, the metadata is placed in the cache at the same address as before (i.e., the address is a function of the URL only); this address is known as the primary address. However, the page itself is located at a different address, the secondary address, which is a function of the URL and the values of the variation parameters for that particular request.

A variation scheme represents a logical family of pages, and each member of that family lives at a different secondary address. The primary address holds the variation scheme and does not hold a member of the family. If a page exists at the primary address, that page is not subject to variation, by definition. For example, suppose Page P100 of FIG. 6 is subject to a variation scheme requiring providing different levels of content to end users based on the level of their subscriptions. The metadata and variation scheme for Page P100 may be placed in the cache at Primary Address 623, which is computed based solely on the URL of Page P100. Suppose the request for content is from a customer with a gold-level subscription and as such a gold-level version of Page P100 is to be served to that customer. As shown in FIG. 6, this gold-level version of Page P100 is not placed in the cache at Primary Address 623. Rather, it is placed in Entry E7 at Secondary Address 625 which is computed using the URL of Page P100 and the value of at least one variation parameter related to the gold-level subscription. The variation parameter value is extracted from the request. As shown in FIG. 6, in this case, no page is placed with the metadata of Page P100 at Primary Address 623. If the request for content is from a customer with a silver-level subscription, a silver-level variant (i.e., P200) is served to that customer. As shown in FIG. 6, Page P200 is not placed in the cache at Primary Address 623. Rather, it is placed in Entry E9 at Secondary Address 627 which is computed using the URL of Page P100 and the value of at least one variation parameter related to the silver-level subscription extracted from the request. In this case, both P100 and P200 are variants in the same variation scheme.

Figure 7:
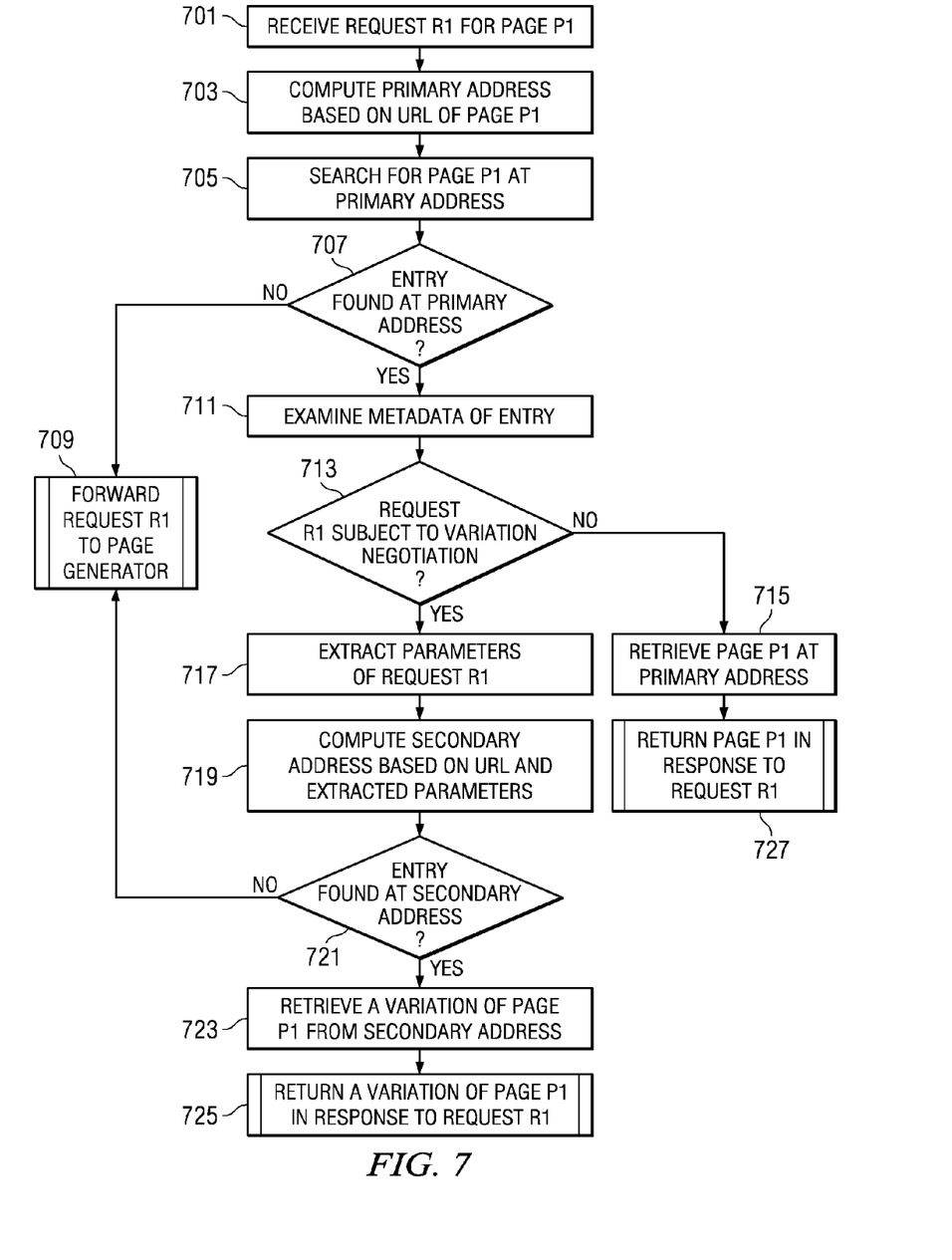
FIG. 7 is a flow diagram illustrating one embodiment of a method for managing page variations in a page delivery cache.

A method for managing page variations in a page delivery cache will now be described in detail with reference to FIG. 7. After CR 30 receives Request R1 for Page P1 (step 701), CR 30 computes a cache address (Primary Address) based solely on the URL referencing Page P1 (step 703). CR 30 then searches the cache for an entry at Primary Address (step 705) and determines whether Page P1 is found at Primary Address (step 707). If there is no entry of Page P1 at Primary Address, the request is immediately forwarded to PG 70 (step 709). If there is an entry, CR 30 examines the entry metadata (step 711) and determines whether requests for that URL are subject to variation negotiation based on page variation information in the entry metadata (step 713). If Request R1 is not subject to variation negotiation, the cached page is retrieved from the same location (step 715) and served as the response to Request R1 (step 727). If the entry metadata indicates that Request R1 is subject to variation negotiation (step 717), CR 30 extracts the request parameters indicated by the metadata and uses the extracted request parameters in conjunction with the URL referencing Page P1 to compute a secondary cache address (Secondary Address) for locating a variation of Page P1 (step 719). CR 30 then searches the cache and determines if a page (i.e., a variation of Page P1) is found at Secondary Address (step 721). If so, CR 30 retrieves that page (step 723) and returns it to satisfy Request R1 (step 725). If no page exists at Secondary Address, Request R1 is forwarded, via CF 65, to PG 70 (step 709). PG 70 then generates the requested page and returns it to CR 30 via CF 65. CR 30 serves the newly generated page, which is a variation of Page P1, in response to Request R1 and CF 65 sends a copy to DM 60 as described above.

When PG 70 generates a page, it also records metadata and dependency information associated with the page. As will be further described below with reference to FIG. 8, a page may have zero or more dependencies. Each dependency may contain a reference to the page and a reference to one or more objects. In addition to the page itself and its associated metadata, any dependencies accumulated while generating the page is also recorded by DM 60. DM 60 then sends the page and its associated metadata to CM 20. Following the above example in which the newly generated page is a variation of Page P1, CM 20 stores the metadata at Primary Address and the newly generated page at Secondary Address. Exemplary metadata stored at Primary Address may include, but is not limited to, page variation, request metadata, template metadata, and so on.

Figure 8:
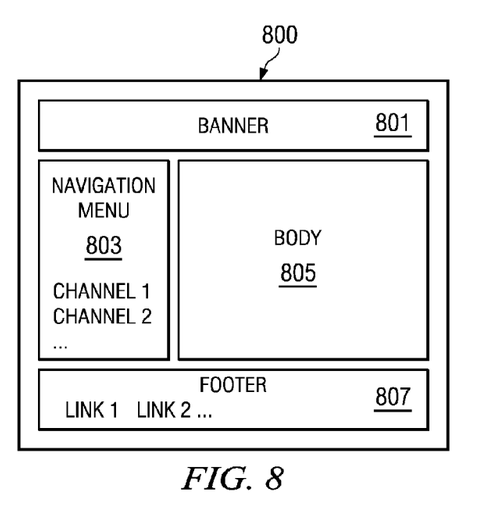
FIG. 8 depicts one embodiment of an example page.

FIG. 8 depicts one embodiment of an example page. Page 800 can be generated using a template and a plurality of objects, including content objects and code objects. Exemplary content objects may contain text, audio, still image, video, multi-media, etc. Exemplary code objects may include various JSPs (Java Server Pages) servlets, active server pages (ASPs), scripts such as VB Scripts or JScripts, ADOs (ActiveX Data Objects), etc. Code objects control the appearance of page 800 or otherwise operate on content objects. A template object may define the layout and/or presentation style of page 800. In the example of FIG. 8, across the top of page 800 is banner area or section 801, on the left is navigation menu area 803, footer area 807 appears at the bottom of page 800, and body section 805 occupies the remaining space of page 800. Content conveyed by content objects are presented through areas 801, 803, 805, and 807 as controlled by code objects. Page 800 can therefore be dependent upon content objects and code objects for content, appearance, functionality, or combinations thereof. For additional teachings on page generation, readers are directed to U.S. patent application Ser. No. 10/358,746, filed May 20, 2003, entitled "CENTRALIZED CONTROL OF CONTENT MANAGEMENT TO PROVIDE GRANULAR ENTERPRISE-WIDE CONTENT MANAGEMENT," which is incorporated herein by reference.

In embodiments disclosed herein, cache readers can be located at the web-tier or at the application-tier of a configuration. Cache readers at the web-tier have no convenient access to session variables because the sessions are stored in the application-tier. Thus, although a web-tier cache reader can successfully resolve references to variations that involve only request headers, query string, or cookies in the variation scheme, it cannot readily resolve references to variations that involve session values in the variation scheme. In some embodiments, session value variation schemes require that a cache reader be deployed in the application-tier. When a web-tier cache reader receives a request for a page subject to session-variable variations, when it consults the cache at the primary address it will either get a cache miss or it will find a metadata entry that indicates that the requested page uses a session-variable variation scheme. In either case, it simply forwards the request to the back-end. There the request is fielded by the application-tier cache reader. That cache reader handles the request as it would any other. It first computes the primary address for the request and probes its cache; if it finds no entry it forwards the request to the page generator, and if it finds an entry it examines the metadata to determine whether a variation scheme is in effect. In this case a variation scheme is in effect, so it uses the metadata to determine what request and session data are needed to compute the secondary address, and then it probes the cache at that secondary address. If an entry exists, it uses that entry to satisfy the request, and if no entry exists it forwards the request to the page generator. The web-tier cache reader and the application-tier cache reader can be associated with different caches, or they can share the same cache.

Figure 9:
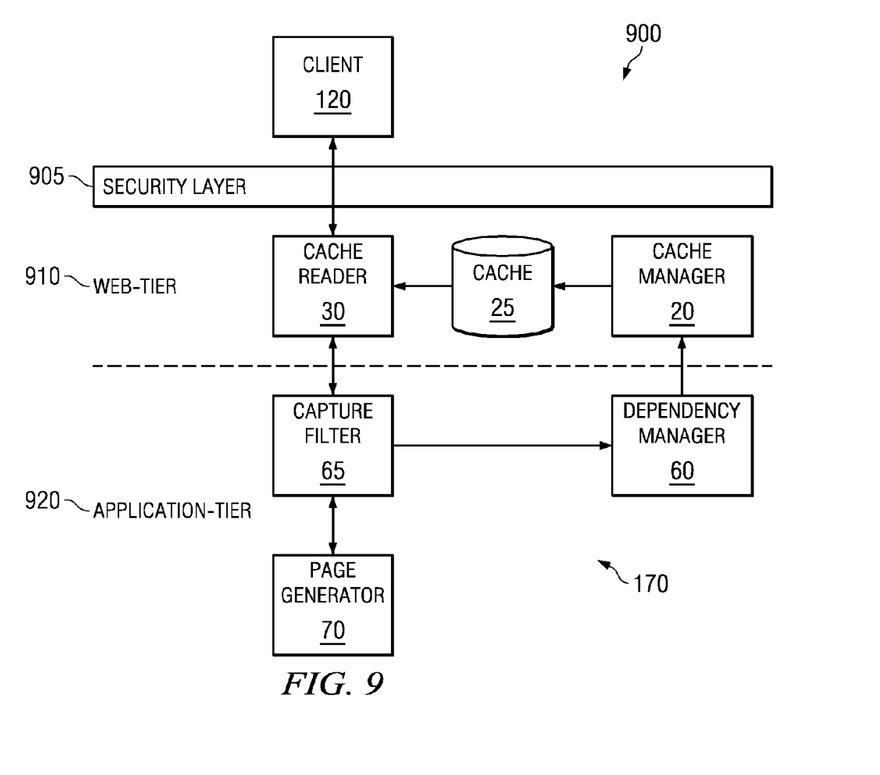
FIG. 9 is a block diagram depicting one embodiment of a content delivery system with a cache reader and a page delivery cache implemented at the web-tier.

FIG. 9 is a block diagram depicting one embodiment of configuration 900. In the example embodiment shown in FIG. 9, content delivery system 170 comprises CR 30, cache 25, and CM 20 implemented at web-tier 910 and PG 70, CF 65, and DM 60 implemented at application-tier 920. Security layer 905 represents a firewall behind which content delivery system 170 resides.

Figure 10:
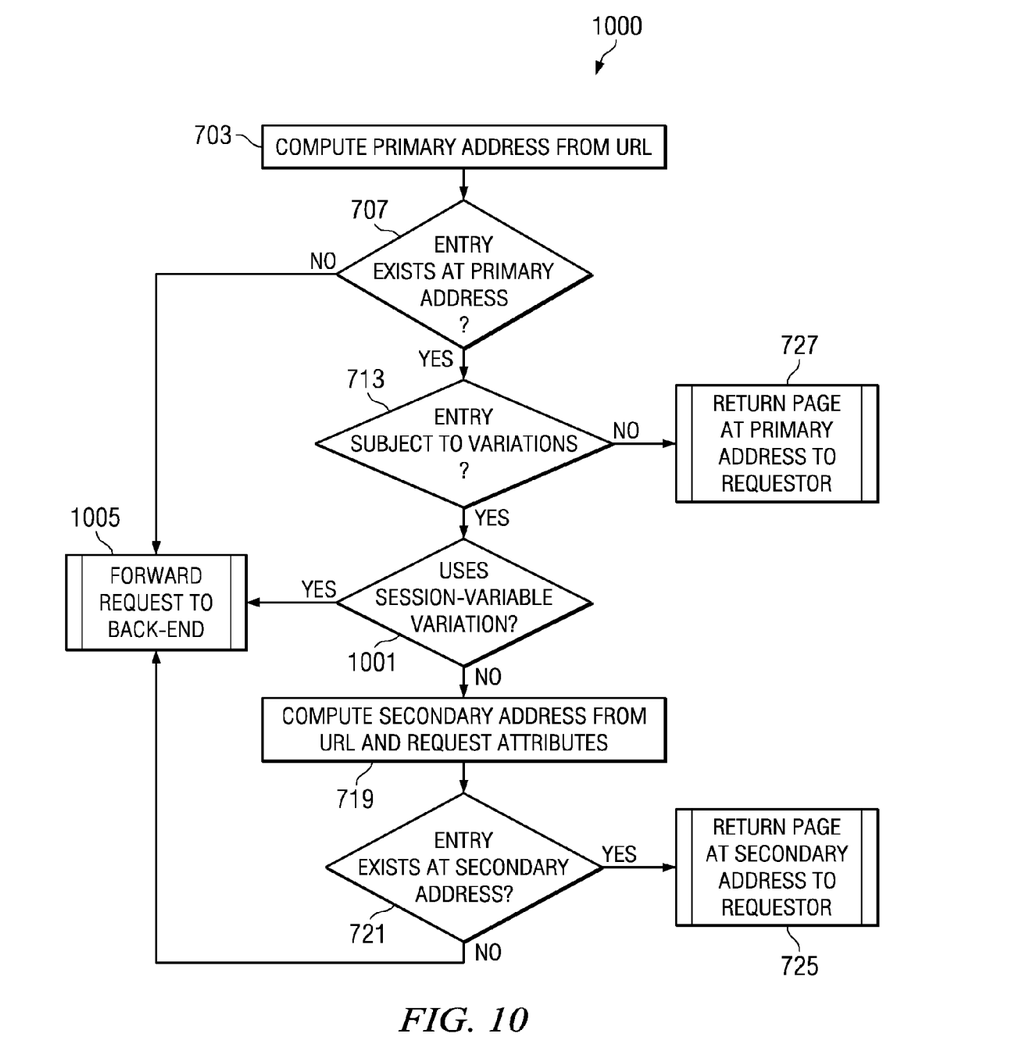
FIG. 10 is a flow diagram illustrating one embodiment of a control flow of a web-tier cache reader.

FIG. 10 is a flow diagram illustrating one embodiment of high level control flow 1000 of CR 30 implemented at web-tier 910. After CR 30 receives a request for page, it computes a primary cache address based on the URL contained in the request (step 703). CR 30 then searches cache 25, which is also implemented at web-tier 910 as shown in FIG. 9, and determines whether any entry exists at the primary address computed from the URL (step 707). If there is no entry at the primary address, the request is immediately forwarded to application-tier 920 at the back-end (step 709). If there is an entry, CR 30 examines the entry metadata and determines whether the entry is subject to variations (step 713). If not, the cached page at the primary address is retrieved and returned as the response to the request (step 727). If CR 30 determines that the entry at the primary address is subject to variations, it checks to see if session-variables are involved in the variation scheme (step 1001). If no session-variables are involved, CR 30 computes the secondary address using the URL contained in the request and attributes extracted from the request (step 719). CR 30 then searches the cache and determines if a page is found at the secondary address (step 721). If a page is found at the secondary address, CR 30 retrieves that page and returns it to satisfy the request (step 725). If no page exists at the secondary address, the request is forward to application-tier 920 at the back-end (step 709). If CR 30 determines that session-variables are involved in the variation scheme at step 1001, it simply forwards the request to the back-end (step 1005). At the back-end, the request is fielded by an application-tier cache reader.

Figure 11:
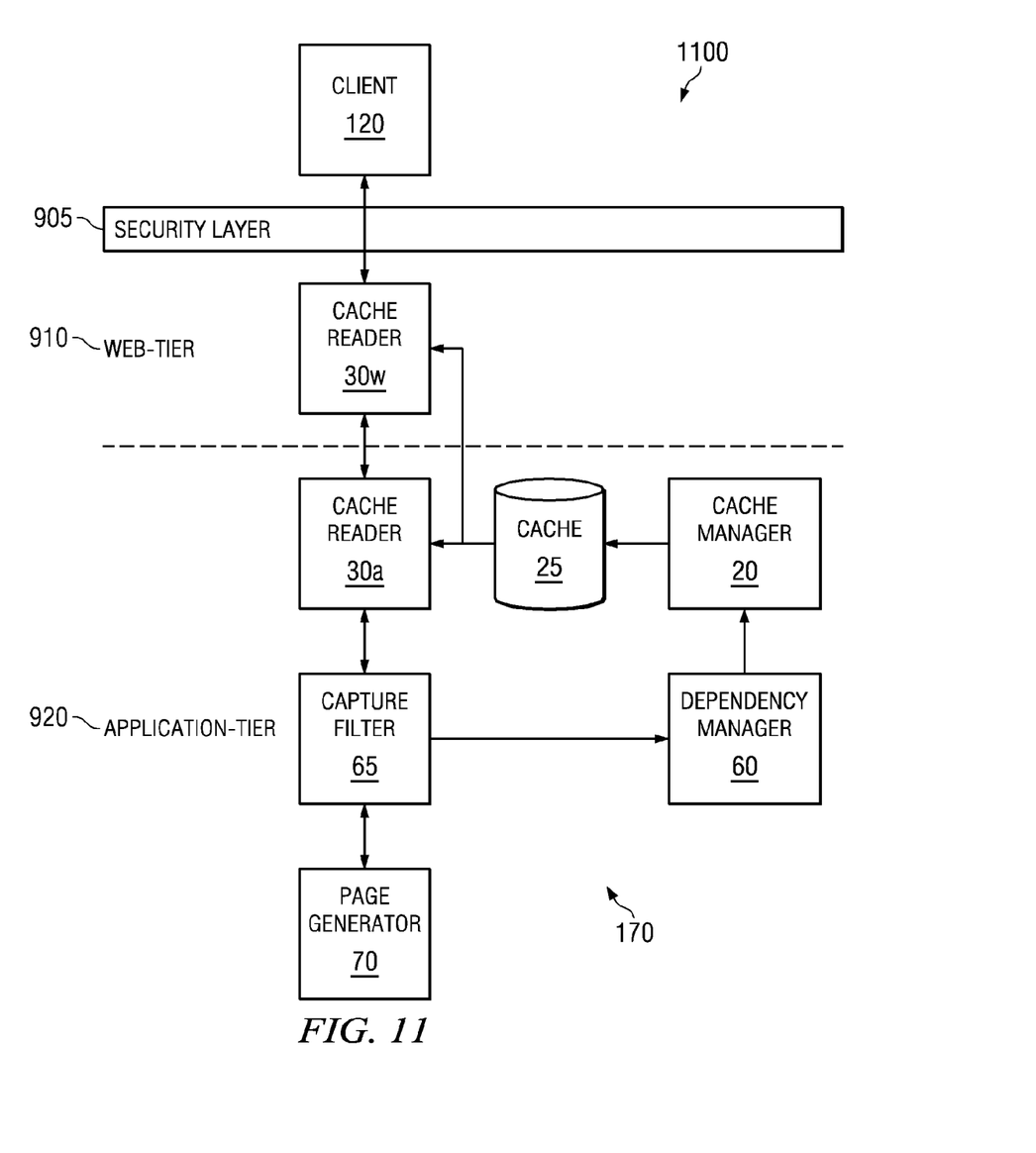
FIG. 11 is a block diagram depicting one embodiment of a content delivery system with a page delivery cache implemented at the application-tier.

FIG. 11 is a block diagram depicting one embodiment of configuration 1100. In the example embodiment shown in FIG. 11, content delivery system 170 comprises CR 30w implemented at web-tier 910 and CR 30a, cache 25, CM 20, PG 70, CF 65, and DM 60 implemented at application-tier 920. Security layer 905 represents a firewall behind which content delivery system 170 resides. In the example embodiment shown in FIG. 11, CR 30w and CR 30a share the same cache 25.

Figure 12:
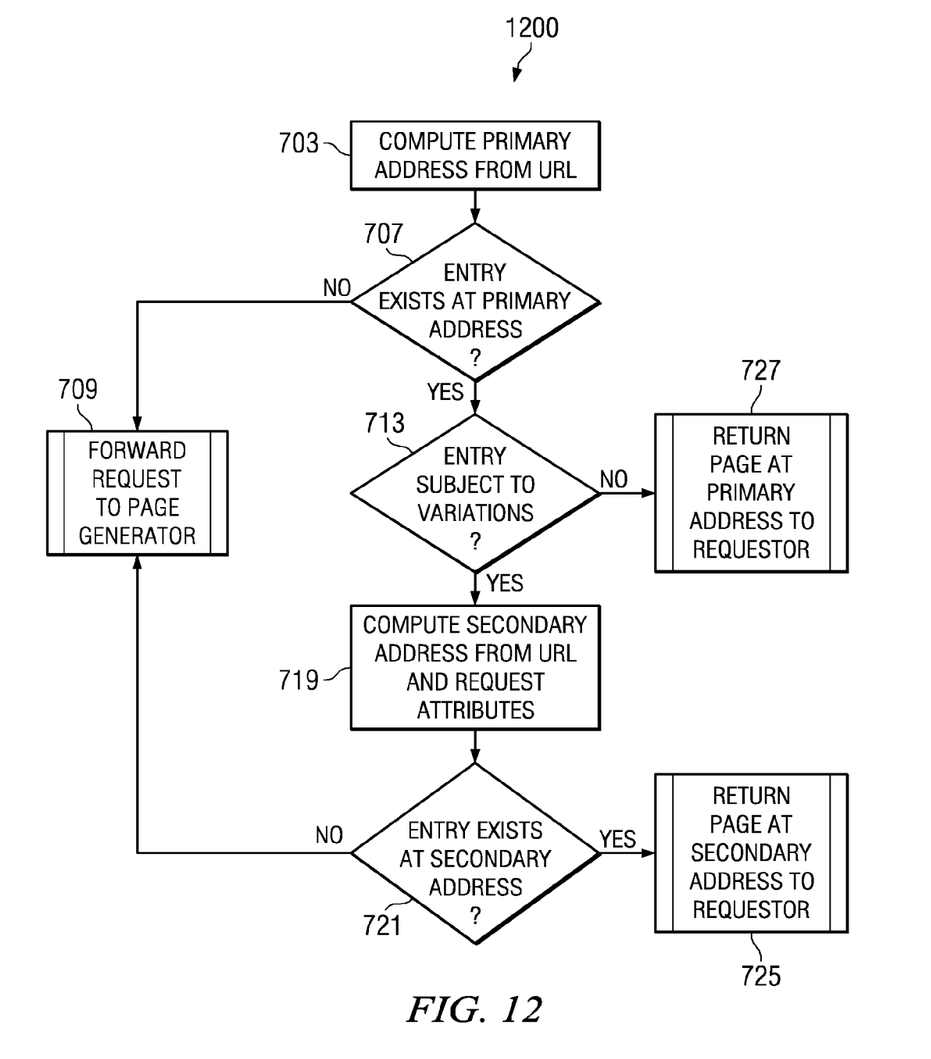
FIG. 12 is a flow diagram illustrating one embodiment of a control flow of an application-tier cache reader.

FIG. 12 is a flow diagram illustrating one embodiment of high level control flow 1200 of CR 30a implemented at application-tier 920. After CR 30a receives a request for page forwarded from CR 30w, CR 30a again computes a primary cache address based on the URL contained in the request (step 703). CR 30a then searches cache 25, which is implemented at application-tier 920 as shown in FIG. 11, and determines whether any entry exists at the primary address computed from the URL (step 707). If there is no entry at the primary address, the request is immediately forwarded to PG 70 (step 709). If there is an entry, CR 30a determines whether the entry is subject to variations (step 713). If not, the cached page at the primary address is retrieved and returned as the response to the request (step 727). If CR 30a determines that the entry at the primary address is subject to variations, including session-variations, it computes the secondary address using the URL contained in the request and attributes, including session-variables, extracted from the request (step 719). CR 30*a* then searches the cache and determines if a page is found at the secondary address (step 721). If so, CR 30*a* retrieves that page and returns it to satisfy the request (step 725). If no page exists at the secondary address, the request is forward to PG 70 (step 709). PG 70 then generates a new page and records the variation information accordingly. The newly generated page, which is a version of the requested page, is returned to the requester and a copy of the variation is placed at the secondary address as described above.

As it will be appreciated by one skilled in the art, CR30*a* can be implemented in several ways. In some embodiments, CR30*a* may function the same way as CR30*w*. This type of implementation has the advantage that CR30*a* works the same way regardless of whether CR30*w* exists or not. In some embodiments, CR30*w* may forward information that could help to reduce the workload on CR30*a*. For example, in some cases where requests are forwarded by CR 30*w*, CR 30*w* may have already calculated the primary address and checked for entry at that address before forwarding a request to the backend. In some cases, CR 30*w* may also have already determined that the request is subject to variations (step 713) before forwarding the request to the backend. Thus, CR30*w* may simply forward the information with the request to CR30*a*. This way, CR30*a* would not have to calculate the primary address, check for entry at that address, and/or determine if the request is subject to variations.

Although the present disclosure has been described in detail herein with reference to the illustrative embodiments, it should be understood that the description is by way of example only and is not to be construed in a limiting sense. It is to be further understood, therefore, that numerous changes in the details of the embodiments disclosed herein and additional embodiments will be apparent to, and may be made by, persons of ordinary skill in the art having reference to this description. Accordingly, the scope of the present disclosure should be determined by the following claims and their legal equivalents.

What is claimed is:

1. A computer program product comprising at least one non-transitory computer readable medium storing instructions translatable by a processor to implement at least two cache readers communicatively connected to a cache storing a plurality of pages, the instructions when translated by the processor further cause the at least two cache readers to perform a plurality of functions including:
    computing a primary cache address based on a uniform resource locator (URL) contained in a request for content from a client computer;
    checking for entry at the primary cache address;
    if no entry is found at the primary cache address, forwarding the request for content to a page generator;
    if an entry is found at the primary cache address, determining whether the entry is subject to a variation scheme;
    if the entry at the primary cache address is not subject to a variation scheme, retrieving and returning a cached page at the primary cache address to satisfy the request for content from the client computer;
    if the entry at the primary cache address is subject to a variation scheme, computing a secondary cache address utilizing the URL contained in the request for content and at least one variation parameter extracted from the request for content;
    checking for entry at the secondary cache address;
    if no page is found at the secondary cache address, forwarding the request for content to the page generator; and
    if a page is found at the secondary cache address, retrieving and returning the page found at the secondary cache address to satisfy the request for content from the client computer.

2. The computer program product of claim 1, wherein a first cache reader of the at least two cache readers forwards the request for content from the client computer to a second cache reader of the at least two cache readers.

3. The computer program product of claim 2, wherein the first cache reader computes the primary cache address and forwards the primary cache address with the request for content from the client computer to the second cache reader.

4. The computer program product of claim 3, wherein the first cache reader determines whether any entry exists at the primary cache address and forwards a result from the check with the request for content from the client computer to the second cache reader.

5. The computer program product of claim 1, wherein each cache reader of the at least two cache readers is capable of performing the plurality of functions.

6. The computer program product of claim 1, wherein each cache reader of the at least two cache readers performs one or more of the plurality of functions.

7. The computer program product of claim 1, wherein the variation scheme requires different levels of content based on user subscriptions.

8. The computer program product of claim 1, wherein a first cache reader of the at least two cache readers is implemented at a web-tier and wherein a second cache reader of the at least two cache readers is implemented at an application-tier.

9. The computer program product of claim 8, wherein the cache is implemented at the web-tier or the application-tier.

10. The computer program product of claim 1, wherein the at least one variation parameter extracted from the request for content comprises one or more session variables associated with the variation scheme.

11. A system, comprising:
    a cache storing a plurality of pages;
    at least two cache readers communicatively connected to the cache, the at least two cache readers embodied on non-transitory computer readable memory including instructions for the at least two cache readers to perform a plurality of functions including:
        computing a primary cache address based on a uniform resource locator (URL) contained in a request for content from a client computer;
        checking for entry at the primary cache address;
        if no entry is found at the primary cache address, forwarding the request for content to a page generator;
        if an entry is found at the primary cache address, determining whether the entry is subject to a variation scheme;
        if the entry at the primary cache address is not subject to a variation scheme, retrieving and returning a cached page at the primary cache address to satisfy the request for content from the client computer;
        if the entry at the primary cache address is subject to a variation scheme, computing a secondary cache address utilizing the URL contained in the request for content and at least one variation parameter extracted from the request for content;
        checking for entry at the secondary cache address;

if no page is found at the secondary cache address, forwarding the request for content to the page generator; and if a page is found at the secondary cache address, retrieving and returning the page found at the secondary cache address to satisfy the request for content from the client computer.

12. The system of claim 11, wherein a first cache reader of the at least two cache readers forwards the request for content from the client computer to a second cache reader of the at least two cache readers.

13. The system of claim 12, wherein the first cache reader computes the primary cache address and forwards the primary cache address with the request for content from the client computer to the second cache reader.

14. The system of claim 13, wherein the first cache reader determines whether any entry exists at the primary cache address and forwards a result from the check with the request for content from the client computer to the second cache reader.

15. The system of claim 11, wherein each cache reader of the at least two cache readers is capable of performing the plurality of functions.

16. The system of claim 11, wherein each cache reader of the at least two cache readers performs one or more of the plurality of functions.

17. The system of claim 11, wherein the variation scheme requires different levels of content based on user subscriptions.

18. The system of claim 11, wherein a first cache reader of the at least two cache readers is implemented at a web-tier and wherein a second cache reader of the at least two cache readers is implemented at an application-tier.

19. The system of claim 18, wherein the cache is implemented at the web-tier or the application-tier.

20. The system of claim 11, wherein the at least one variation parameter extracted from the request for content comprises one or more session variables associated with the variation scheme.

* * * * *